N. C. SCHAFFER.
AUTOMOBILE FENDER.
APPLICATION FILED DEC. 3, 1914.
1,137,170.
Patented Apr. 27, 1915.
2 SHEETS—SHEET 1.
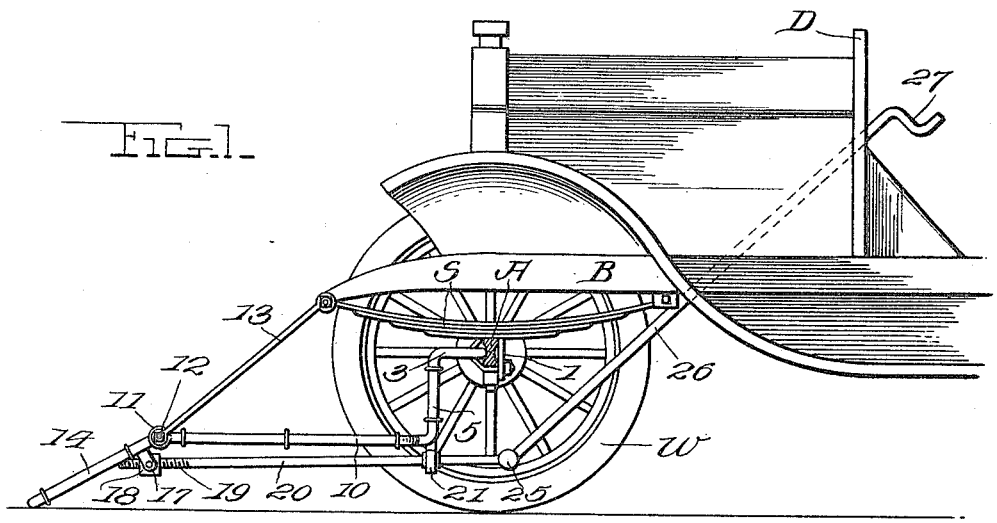
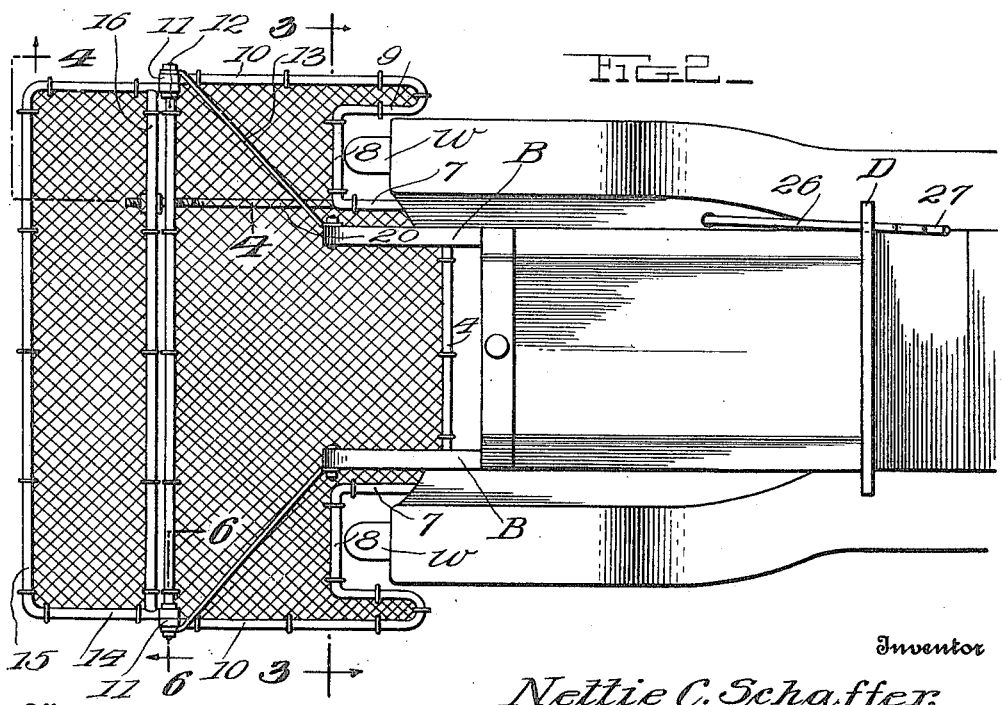
Witnesses
J. R. Pierce
E. Munkin
Inventor
Nettie C. Schaffer.
By H. B. Willson & Co.
Attorneys

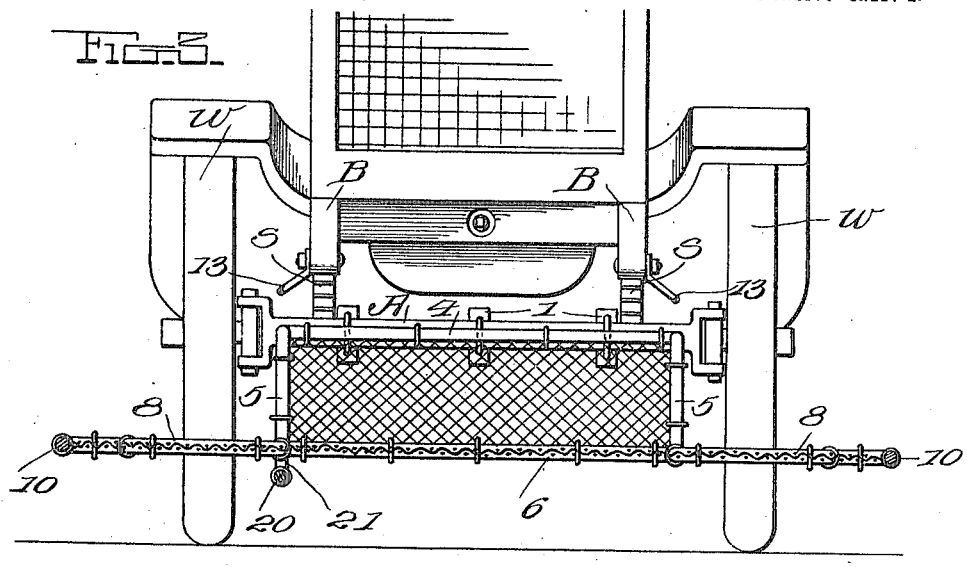
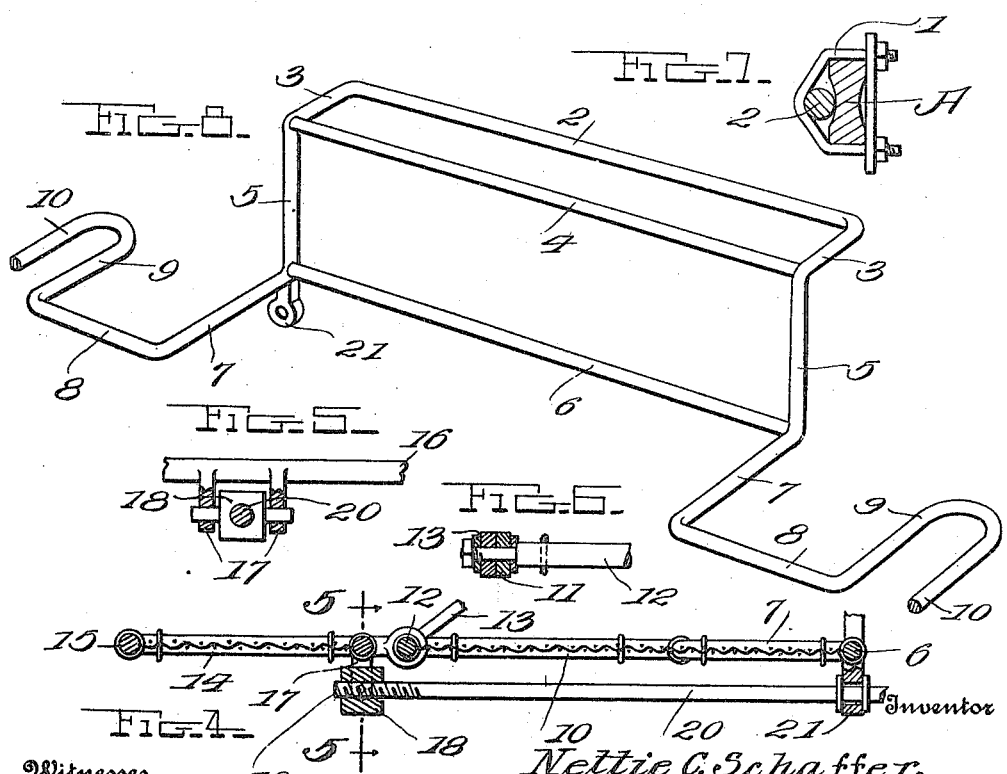

UNITED STATES PATENT OFFICE.

NETTIE CODTHERITA SCHAFFER, OF MILWAUKEE, WISCONSIN.

AUTOMOBILE-FENDER.

1,137,170.                    Specification of Letters Patent.      Patented Apr. 27, 1915.

Application filed December 3, 1914.   Serial No. 875,306.

*To all whom it may concern:*

Be it known that I, NETTIE CODTHERITA SCHAFFER, a citizen of the United States, residing at Milwaukee, in the county of Milwaukee and State of Wisconsin, have invented certain new and useful Improvements in Automobile-Fenders; and I do declare the following to be a full, clear, and exact description of the invention, such as will enable others skilled in the art to which it appertains to make and use the same.

My invention relates to improvements in fenders and more particularly to those adapted for use on motor vehicles.

The object of the invention is to provide a comparatively simple fender which will be well adapted to the purpose for which it is designed, which may be inexpensively marketed, and which will present a neat appearance when applied to use.

To the above end, I employ certain novel features of construction and combination herein described and claimed and shown in the accompanying drawings wherein:—

Figure 1 is a side elevation of an automobile showing the application of my invention thereto, one wheel of the machine being removed; Fig. 2 is a top plan view of the parts seen in Fig. 1; Fig. 3 is a vertical transverse section as seen on the line 3—3 of Fig. 2; Fig. 4 is a detail longitudinal section as seen on the line 4—4 of Fig. 2; Fig. 5 is a detail transverse section taken on the line 5—5 of Fig. 4; Fig. 6 is a similar view taken on the line 6—6 of Fig. 2; Fig. 7 is a detail vertical section showing more particularly one of the clamps for securing the fender to the front axle of the automobile; and Fig. 8 is a perspective view of the rear end of the fender frame.

In these drawings, constituting a part of this application, I have shown my improved fender as applied to an automobile whose chassis includes the usual longitudinal side bars B which project forwardly from the front axle A and which are connected to said axle by springs S. On the opposite ends of the axle A are the usual wheels W.

Secured to the axle A, by means of clamps 1 which may be of any appropriate design, is a transverse bar 2 which is here shown as contacting with said axle throughout its length, the opposite ends of said bar 2 being bent forwardly at 3 to provide spacing arms, the ends of which are connected by a transverse bar 4. The free ends of the spacing arms 3 are bent downwardly to provide a pair of upright bars 5 whose lower ends are connected by a transverse bar 6 and are then continued forwardly as seen at 7, the forward ends of the portions 7 being bent laterally in front of the wheels W as at 8, being then continued rearward at 9, and being here again bent and continued forwardly to provide a pair of side bars 10. The front ends of the bars 10 are provided with bearings 11 through which a transverse spacing and hinge rod 12 is passed, a pair of braces 13 being here shown as extending upwardly and inwardly from the ends of the rod 12 to the ends of the bars B, whereby the side bars 10 are properly supported.

Hingedly connected to the rod 12 by suitable bearings revolubly mounted thereon, are the rear ends of a pair of side bars 14 of a movable fender section, said side bars being connected by a front transverse bar 15 and by a rear transverse bar 16.

Depending from the bar 16, and therefore positioned eccentrically in respect to the hinge rod 12, is a pair of spaced ears 17 between which a nut 18 is pivoted to oscillate vertically, said nut having a rather coarsely pitched screw thread in which a worm 19 on the front end of a horizontal shaft 20 is threaded, said shaft being located in a plane beneath the plane of the side bars 10 and having its rear end revolubly mounted and held against longitudinal movement in a bearing 21 which depends from one of the bars 5. By this construction, rotation of the shaft 20 in the proper direction will pull the nut 18 rearwardly, thereby moving the movable section of the fender from the position seen in Fig. 4 to that seen in Fig. 1, the rotation of said shaft in the opposite direction of course throwing the movable section upwardly from the lowered position shown in Fig. 1.

For the purpose of rotating the shaft 20, its rear end is universally connected at 25 to an upwardly and rearwardly inclining shaft 26 whose upper end passes through the dash board D of the automobile and is provided with a crank 27, whereby it may be rotated.

It may here be explained, that on account of the coarse pitch of the worm 19 and the threads in the nut 18, only a slight part of a revolution of the shafts 26 and 20, will be required to adjust the movable section, it being therefore possible to make this adjustment very quickly.

The frame structure above described, may be provided with any appropriate form of cover, this covering being preferably made of light resilient material for obvious reasons.

By constructing the device as above described and shown in the accompanying drawings, it will be readily applicable to most types of automobiles to which it may be quickly and easily attached or detached. I have shown the device as applied to an ordinary form of passenger vehicle, but it will be understood that it could be used to equal, if not to greater advantage, upon heavy motor trucks. In either case, the crank 27 would be so located as to allow it to be readily rotated by the chauffeur, whereby the movable section may be lowered in case striking a person cannot be averted, and whereby said section may be again raised to prevent such a person from rolling off the front end of the fender.

I have described the invention with considerable detail and have set forth certain features of construction which may be well employed for reducing the invention to practical use but it will be readily understood that I need not be limited to such details of construction, otherwise than as set forth in the appended claims.

From the foregoing description, taken in connection with the accompanying illustration, it will be seen that a comparatively simple fender has been provided, yet one which will be efficient in operation and which will present a neat and attractive appearance when applied to use.

I claim:

1. The combination with a vehicle and a fender in advance thereof comprising a fixed section secured to the vehicle, and a movable section hinged to the front of the fixed section, of a revolubly mounted horizontal shaft extending forwardly from the vehicle and disposed beneath the fixed section, means on the rear end of the shaft for rotating the same, and connections between the front end of the shaft and the movable section, for rocking the latter around its hinges.

2. The combination with a vehicle and a fender in advance thereof comprising a fixed section secured to the vehicle, and a movable section hinged to the front of the fixed section, of a revolubly mounted shaft extending forwardly from the vehicle, means on the rear end of the shaft for rotating the same, a worm on the front end of said shaft, and a nut carried by the movable section and into which said worm is threaded, whereby to swing said section around its hinges as the shaft is rotated.

3. The combination with a vehicle and a fender in advance thereof comprising a fixed section secured to the vehicle, and a movable section hinged to the fixed section, of a bearing depending from the fixed section, a horizontal shaft revolubly mounted and held against longitudinal movement in said bearing, connections between the front end of the shaft and the movable section to adjust the latter as the shaft is rotated, and means connected to said shaft whereby it may be rotated.

4. The combination with a vehicle and a fender in advance thereof and comprising a fixed section secured to the vehicle, and a movable section hinged to the fixed section, of a pair of ears depending from the movable section, a nut pivoted between said ears, a bearing depending from the fixed section and alining with the nut, a horizontal shaft revolubly mounted in and held against longitudinal movement in said bearing, a worm on the free end of said shaft threaded into said nut, whereby rotation of said shaft will swing the movable section around its hinges, and means connected to the rear end of the shaft for rotating the same.

5. The combination with a vehicle, of a transverse bar parallel and in contact with the front axle thereof, clamps securing the bar to the axle, a fender projecting forwardly from said bar, and braces for said fender.

6. The combination with a vehicle, of a transverse bar secured to the front axle thereof and having its ends extending forwardly and then bent laterally in advance of the front wheels of the vehicle, said laterally bent ends being then continued forwardly to provide side bars, and a fender supported by said side bars.

In testimony whereof I have hereunto set my hand in presence of two subscribing witnesses.

NETTIE CODTHERITA SCHAFFER.

Witnesses:
ROBERT L. KUHN,
ROSE T. EWENS.

Copies of this patent may be obtained for five cents each, by addressing the "Commissioner of Patents, Washington, D. C."